(12) United States Patent
Gao et al.

(10) Patent No.: US 9,629,058 B1
(45) Date of Patent: Apr. 18, 2017

(54) CHANNEL EFFICIENT TUNE AWAY PROCEDURE

(71) Applicant: QUALCOMM Incorporated, San Diego, CA (US)

(72) Inventors: Xuanning Gao, San Diego, CA (US); Yash Kharia, San Diego, CA (US); Sheikh Hafiz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/985,149

(22) Filed: Dec. 30, 2015

(51) Int. Cl.
*H04W 36/00* (2009.01)
*H04W 36/38* (2009.01)
*H04W 72/04* (2009.01)
*H04W 84/12* (2009.01)

(52) U.S. Cl.
CPC ....... *H04W 36/38* (2013.01); *H04W 72/0446* (2013.01); *H04W 84/12* (2013.01)

(58) Field of Classification Search
USPC .......................................................... 455/438
See application file for complete search history.

(56) References Cited

U.S. PATENT DOCUMENTS

| 2005/0124294 A1 | 6/2005 | Wentink |
| 2007/0097922 A1 | 5/2007 | Parekh et al. |
| 2008/0107156 A1 | 5/2008 | Wentick et al. |
| 2013/0201884 A1 | 8/2013 | Freda et al. |
| 2014/0226505 A1 | 8/2014 | Sadek |

*Primary Examiner* — Joel Ajayi
(74) *Attorney, Agent, or Firm* — Holland & Hart LLP

(57) ABSTRACT

Methods, systems, and apparatuses for wireless communication are described. A wireless station (STA) may receive a frame from an access point (AP) reserving a channel for a time period. The frame may include an information field associated with a tune away procedure performed by the AP during the time period. The STA may perform, based on the information field, direct communications with a neighboring device on the channel during the time period.

38 Claims, 8 Drawing Sheets

CHANNEL EFFICIENT TUNE AWAY PROCEDURE

BACKGROUND

Field of the Disclosure

The present disclosure, for example, relates to wireless communication systems, and more particularly to efficient techniques to perform a tune away procedure on a channel.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with at least one station (STA) or mobile devices. The AP may be coupled to a network, such as the Internet, and enable a mobile device to communicate via the network (and/or communicate with other devices coupled to the access point).

Wi-Fi networks typically employ STA-based power-saving techniques for the STAs to manage coexistence or concurrency events, e.g., such as off channel scanning events for the STA, Bluetooth or cellular wireless communication systems coexistence, STA and peer-to-peer (P2P) communications using different channels, etc. Conventional techniques may include preventing the AP from transmitting frames to the STA while the STA has tuned away from the channel.

From the AP perspective, such techniques may include the AP transmitting a clear-to-send (CTS) frame to itself (CTS-to-self or CTS-S) that reserves the channel while the AP has tuned away. The technique operates by preventing other channel coexistent devices from transmitting on the channel during the time when the channel can be reserved by, and as indicated in, the CTS-S. This mechanism, however, can be wasteful because traffic that is not directed to the AP cannot be sent during this time period and the channel remains idle during the AP tune away procedure.

SUMMARY

The described features generally relate to improved methods, systems, devices, and apparatuses that provide channel efficient tune away procedures. Generally, the described techniques provide for the STA to learn and/or be informed that the CTS-S frame transmitted by the AP can be for an AP tune away procedure. The STA may then continue to communicate on the channel while the AP has tuned away. For example, a STA may receive a frame from the AP that reserves the channel for a time period (e.g., a CTS-S frame). The frame may include a field or bit selected to convey an indication that the AP is performing a tune away procedure during the reserved time period. Therefore, the STA may determine that the channel can be available during the time period and use the channel for communications while the AP has tuned away, e.g., perform direct, P2P, or other communications on the channel. In other examples, the STA may learn the AP's tune away procedures by monitoring several frames and determining there are no transmissions from the AP during the time periods. Therefore, the STA may determine that the frames transmitted by the AP are associated with a tune away procedure and may use the channel for communications.

A method for wireless communication at a device is provided. The method may include: receiving, from an access point (AP), a frame reserving a channel for a time period, the frame comprising an information field associated with a tune-away procedure performed by the AP during the time period; and performing, based at least in part on the information field, direct communications with a neighboring device on the channel during the time period.

The method may include decoding a power management field of a clear-to-send (CTS) to self (CTS-S) frame to identify the information field. The method may include decoding a power management field of a broadcast action frame to identify the information field. The broadcast action frame may be decoded after decoding a clear-to-send (CTS) to self (CTS-S) frame. The method may include receiving, from the AP, a second frame releasing the channel, the second frame conveying an indication that the AP has completed the tune-away procedure.

The method may include performing a channel access procedure on the channel prior to performing the direct communications with the neighboring device. The AP may be a mobile hotspot. The AP may be a Wi-Fi AP. Performing direct communications with the neighboring device may include streaming content to the neighboring device on the channel during the time period. The channel may be a Wi-Fi display channel.

An apparatus for wireless communications is provided. The apparatus may include: a frame reservation manager to receive, from an access point (AP), a frame reserving a channel for a time period, the frame comprising an information field associated with a tune-away procedure performed by the AP during the time period; and a direct communication manager to perform, based at least in part on the information field, direct communications with a neighboring device on the channel during the time period.

The frame reservation manager may decode a power management field of a clear-to-send (CTS) to self (CTS-S) frame to identify the information field. The frame reservation manager may decode a power management field of a broadcast action frame to identify the information field. The broadcast action frame may be decoded after decoding a clear-to-send (CTS) to self (CTS-S) frame. The direct communication manager may receive, from the AP, a second frame releasing the channel, the second frame conveying an indication that the AP has completed the tune-away procedure.

The direct communication manager may perform a channel access procedure on the channel prior to performing the direct communications with the neighboring device. The AP may be a mobile hotspot. The AP may be a Wi-Fi AP. The direct communication manager to perform direct communications with the neighboring device may be to stream content to the neighboring device on the channel during the time period. The channel may be a Wi-Fi display channel.

A method for wireless communication is provided. The method may include: receiving, from an access point (AP), a plurality of clear-to-send (CTS) to self (CTS-S) frames reserving a channel, each CTS-S frame reserving the channel for at least one time period; determining that the AP is not communicating during a predetermined number of the time periods; and performing a direct communications with a neighboring device based at least in part on the AP not communicating during the predetermined number of time periods.

Determining that the AP is not communicating during the predetermined number of time periods may include determining that the AP has not transmitted on the channel. The method may include: determining that the AP has communicated on the channel during at least one of the time periods; and refraining from performing the direct communications with the neighboring devices based at least in part on the AP has communicated. The AP may be a serving AP. The AP may be a non-serving AP.

An apparatus for wireless communication is provided. The apparatus may include: a frame reservation manager to receive, from an access point (AP), a plurality of clear-to-send (CTS) to self (CTS-S) frames reserving a channel, each CTS-S frame reserving the channel for at least one time period; a channel tune away manager to determine that the AP is not communicating during a predetermined number of the time periods; and a direct communication manager to perform a direct communications with a neighboring device based at least in part on the AP not communicating during the predetermined number of time periods.

The channel tune away manager to determine that the AP is not communicating during the predetermined number of time periods may be to determine that the AP has not transmitted on the channel. The channel tune away manager may be to determine that the AP has communicated on the channel during at least one of the time periods; and the direct communication manager may be to refrain from performing the direct communications with the neighboring devices based at least in part on the AP has communicated. The AP may be a serving AP. The AP may be a non-serving AP.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
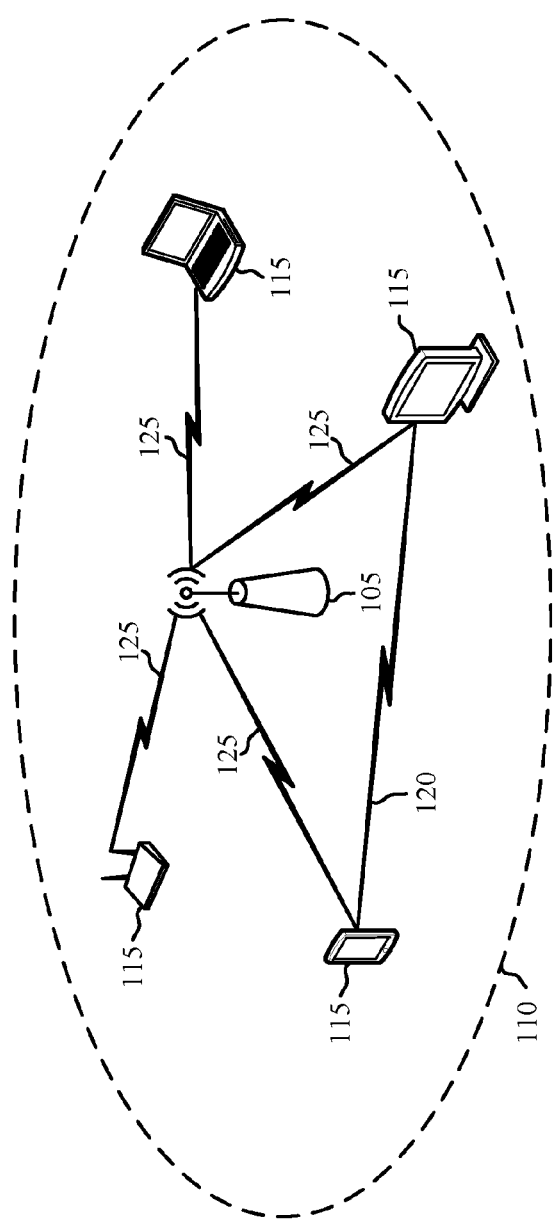
FIG. 1 shows a block diagram of a wireless communication system, in accordance with various aspects of the present disclosure.

An access point (AP) operating on a channel may perform a tune away procedure where the AP temporarily tunes to a different channel for channel measurements, communications on the different channel, backhaul communications, etc. Prior to tuning away, the AP may transmit a clear-to-send (CTS) frame to itself (CTS-to-self or CTS-S) to reserve the channel for the time period that the AP has tuned away. The CTS-S frame typically indicates the time period the channel is being reserved, and prevents other devices from transmitting frames to the AP on the channel while the AP has tuned to a different channel. The CTS-S frame reserving the channel, however, also prevents other devices from using the channel. Instead, the channel remains idle and the medium is unused during the AP tune away procedure.

Aspects of the present disclosure are initially described in the context of a wireless communication system and provide a means for efficient use of a channel while an AP performs a tune away procedure. Broadly, the described techniques provide for wireless stations (STAs) to use the channel for communications while the AP has tuned away from the channel, e.g., communications that are not directed to the AP. A STA may receive an indication that the AP is performing a tune away procedure and/or may learn the AP's tune away behavior and may use the channel during the AP tune away procedure. For example, the STA may receive a frame from the AP indicating that the AP is performing a tune away procedure. The frame may be a CTS-S frame and/or a broadcast action frame, for example, that includes an information bit or field that provides the indication. In some examples, a power management field may be used to indicate the CTS-S frame is used for an AP tune away procedure. The STA may then use the channel to perform communications that are not directed to the AP, e.g., direct communications with a neighboring device, peer-to-peer (P2P) communications, broadcast communications, etc. Thus the channel may be utilized by the STA and/or other STAs while the AP has tuned away.

In another example, the STA may determine that the AP is performing a tune away procedure by learning the AP's tune away behavior. The STA may monitor, or receive, a certain number of CTS-S frames from the AP and determine whether the AP is communicating during the time periods associated with each CTS-S frame. The STA may identify a pattern, periodicity, etc., associated with the AP transmitting CTS-S frames and then not communicate during the associated time periods. The STA may therefore determine that the CTS-S frames are associated with AP tune away procedures. Thus, the STA may determine the AP's tune away behavior to within a degree of confidence and use this to communicate on the channel while the AP is performing a tune away procedure. The STA may learn AP tune away behavior for its serving AP and/or for neighboring APs that are non-serving APs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a wireless local area network (WLAN) 100 such as, e.g., a network implementing at least one of the IEEE 802.11 family of standards (also referred to as a Wi-Fi network). The WLAN 100 may include an access point (AP) 105 and wireless devices or stations (STAs) 115, such as mobile stations, personal digital assistants (PDAs), other handheld devices, netbooks, notebook computers, tablet computers, laptops, display devices (e.g., TVs, computer monitors, etc.), printers, etc. While only one AP 105 is illustrated, the WLAN 100 may have multiple APs 105. Each of the STAs 115, which may also be referred to as mobile stations (MSs), mobile devices, access terminals (ATs), user equipment (UE), subscriber stations (SSs), or subscriber units, may associate and communicate with an AP 105 via a communication link 125. Each AP 105 has a geographic coverage area 110 such that STAs 115 within that area can typically communicate with the AP 105. The STAs 115 may be dispersed throughout the geographic coverage area 110. Each STA 115 may be stationary or mobile.

Although not shown in FIG. 1, a STA 115 can be covered by more than one AP 105 and can therefore associate with more than one AP 105 at different times. A single AP 105 and an associated set of stations may be referred to as a basic service set (BSS). An extended service set (ESS) is a set of connected BSSs. A distribution system (DS) (not shown) is used to connect APs 105 in an extended service set. The geographic coverage area 110 for an AP 105 may be divided into sectors making up only a portion of the coverage area (not shown). The WLAN 100 may include APs 105 of different types (e.g., metropolitan area, home network, etc.), with varying sizes of coverage areas and overlapping coverage areas for different technologies. In some examples, a STA 115 may perform the functions as an AP 105, such as when the STA 115 functions as a mobile hotspot (MHS). Although not shown, other wireless devices can communicate with the AP 105.

While the STAs 115 may communicate with each other through the AP 105 using communication links 125, each STA 115 may also communicate directly with other STAs 115 via a direct wireless link 120. Two or more STAs 115 may communicate via a direct wireless link 120 when both STAs 115 are in the AP 105 geographic coverage area 110 or when one or neither STA 115 is within the AP 105 geographic coverage area 110 (not shown). Examples of direct wireless links 120 may include Wi-Fi Direct connections, connections established by using a Wi-Fi Tunneled Direct Link Setup (TDLS) link, a Wi-Fi display channel, and other peer-to-peer (P2P) group connections. The STAs 115 in these examples may communicate according to the WLAN radio and baseband protocol including physical and media access control (MAC) layers from institute of electrical and electronics engineers (IEEE) 802.11, and its various versions including, but not limited to, 802.11b, 802.11g, 802.11a, 802.11n, 802.11ac, 802.11ad, 802.11ah, etc. In other implementations, other P2P connections and/or ad hoc networks may be implemented within WLAN 100.

WLAN 100 supports efficient channel usage during periods when AP 105 performs a tune away procedure. AP 105 typically communicates with STAs 115 on a channel, e.g., a primary channel associated with communication link 125. AP 105 may, however, tune away from the primary channel and tune to a secondary channel for channel measurements, perform backhaul communications, etc. AP 105 may transmit a frame to reserve the channel while the AP 105 is tuned away, e.g., a CTS-S frame with the receiver address set to the AP's 105 own address. The frame may include frame control information elements or fields, such as a power management field, that may be used to provide an indication that the AP 105 is transmitting the frame to reserve the channel while the AP 105 tunes to the different channel. The frame may reserve the channel for a time period, which the AP 105 may select based on an estimated time period needed for the tune away procedure.

STAs 115 may receive the frame reserving the channel and read or decode the information field indicating that the frame is associated with a tune away procedure. The STAs 115 may then use the channel for communications while the AP 105 has tuned away, e.g., for direct communications between neighboring STAs 115, for P2P communications, for broadcast communications, etc.

In some examples, the frame may not provide an indication that the channel is being reserved for a tune away procedure. Instead, the STAs 115 may determine that the frame is associated with a tune away procedure by learning the APs 105 tune away behavior. For example, the STA 115 may receive or monitor multiple CTS-S frames transmitted by AP 105 and determine whether the AP 105 is communicating during the corresponding time periods associated with the CTS-S frames. The STAs 115 may identify or otherwise determine a pattern or periodicity of CTS-S frames where the AP 105 is not communicating during the associated time periods. The STAs 115 may use this information to determine, at least to a certain confidence level, when the AP 105 is transmitting a CTS-S frame for a tune away procedure. The STAs 115 may then use the channel for direct communications while the AP 105 is performing its tune away procedure.

Figure 2:
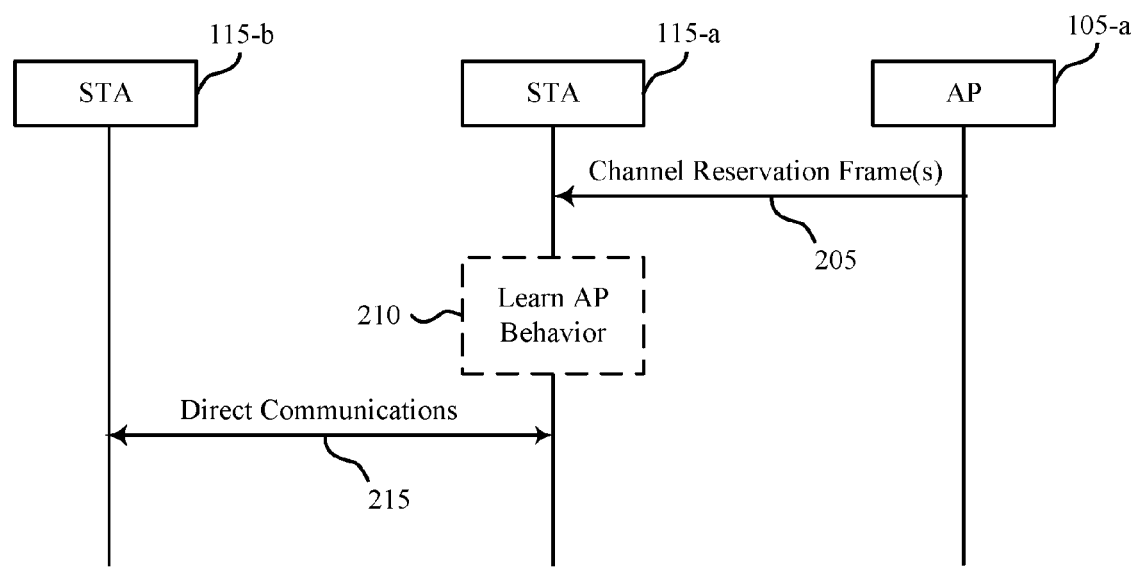
FIG. 2 shows an example of wireless communication between wireless stations and an access point that supports channel efficient tune away procedures, in accordance with various aspects of the present disclosure.

FIG. 2 illustrates a diagram 200 of wireless communications that supports channel efficient tune away procedures. Generally, diagram 200 shows an example of wireless communications between STA 115-a, STA 115-b, and/or AP 105-a. STA 115-a, STA 115-b, and/or AP 105-a may be examples of the corresponding devices described with reference to FIG. 1. The AP 105-a may be a Wi-Fi AP and/or be a STA 115 operating as a mobile hotspot (MHS) to provide the functionality of an AP. Moreover, the AP 105-a may be a serving AP or a non-serving AP for STA 115-a and/or STA 115-b. Broadly, diagram 200 illustrates an example where STAs 115-a and/or 115-b may learn or receive an indication that the AP 105-a is reserving a channel while the AP 105-a tunes away. The STAs 115-a and 115-b may use the channel for direct communications during the AP 105-a tune away procedure.

At 205, the AP 105-a may transmit a frame to STA 115-a that reserves a channel for a time period. The channel may be a conventional channel associated with uplink control and/or downlink control or data communications. The channel may, in some examples, include a Wi-Fi display channel associated with streaming content, such as multimedia content, audio content, video content, etc. The frame may, in some examples, include a bit or information field that provides an indication to the STA 115-a that the AP 105-a is performing a tune away procedure during the time period. In other examples, the frame may be a CTS-S frame that may or may not include the indication that the AP 105-a is performing a tune away procedure. In yet another example, the AP 105-a may transmit the CTS-S frame without the indication and then transmit a broadcast action frame that includes the information field indicating the AP 105-a is performing a tune away procedure. The power management field in the CTS-S and/or the broadcast action frame may be used to convey the indication that the AP 105-a is performing a tune away procedure. The STA 115-a may receive the frame and decode the information element to determine that the AP 105-a is performing a tune away procedure.

In some examples at 210, the STA 115-a may learn the AP's 105-a behavior with respect to tune away procedures. For example, the STA 115-a may receive multiple CTS-S frames from the AP 105-a. Each CTS-S frame may reserve the channel for a time period, but may not necessarily include the information field indicating the AP 105-a is performing a tune away procedure. For each, or a plurality of the CTS-S frames, the STA 115-a may monitor the channel to determine whether the AP 105-a is transmitting on the channel. If the STA 115-a determines that the AP 105-a is not communicating on the channel for a predetermined number of time periods associated with CTS-S frames, the STA 115-a may identify these time periods as being associated with an AP 105-a tune away procedure.

The STA 115-a may monitor N number of CTS-S frames and corresponding time periods, where N is a positive integer. The STA 115-a may identify a timing component associated with each CTS-S frame and use the timing component to identify a duty cycle or periodicity for each tune away procedure time period. The duty cycle or periodicity may be determined within a certain degree of error margin, e.g., a configurable margin based on slot time(s), a short inter-frame space(s) (SIFS), and/or time components (such as microseconds). If the duration or duty cycle of CTS-S frames associated with tune away procedures is within the error margin, the STA 115-a may determine which CTS-S frames are associated with AP 105-a tune away procedures. The STA 115-a may maintain or store a list of APs 105 (such as AP 105-a) whose tune away behavior has been determined. The STA 115-a may, in some examples, determine that the AP 105-a has transmitted during a CTS-S time period and therefore repeat the learning procedure for the AP 105-a.

At 215, the STA 115-a may perform direct communications with the STA 115-b on the channel during the time period associated with the AP 105-a tune away procedure from the channel. For example, the STA 115-a may use channel access procedures to perform the direct communications, e.g., carrier sensing, request-to-send/clear-to-send (RTS/CTS) procedures, and the like. The channel may be a Wi-Fi channel, in some examples, and the direct communications may include the STA 115-a streaming content to the STA 115-b. The direct communications may be performed using a direct communication link, such as direct wireless link 120 described with reference to FIG. 1.

Figure 3:
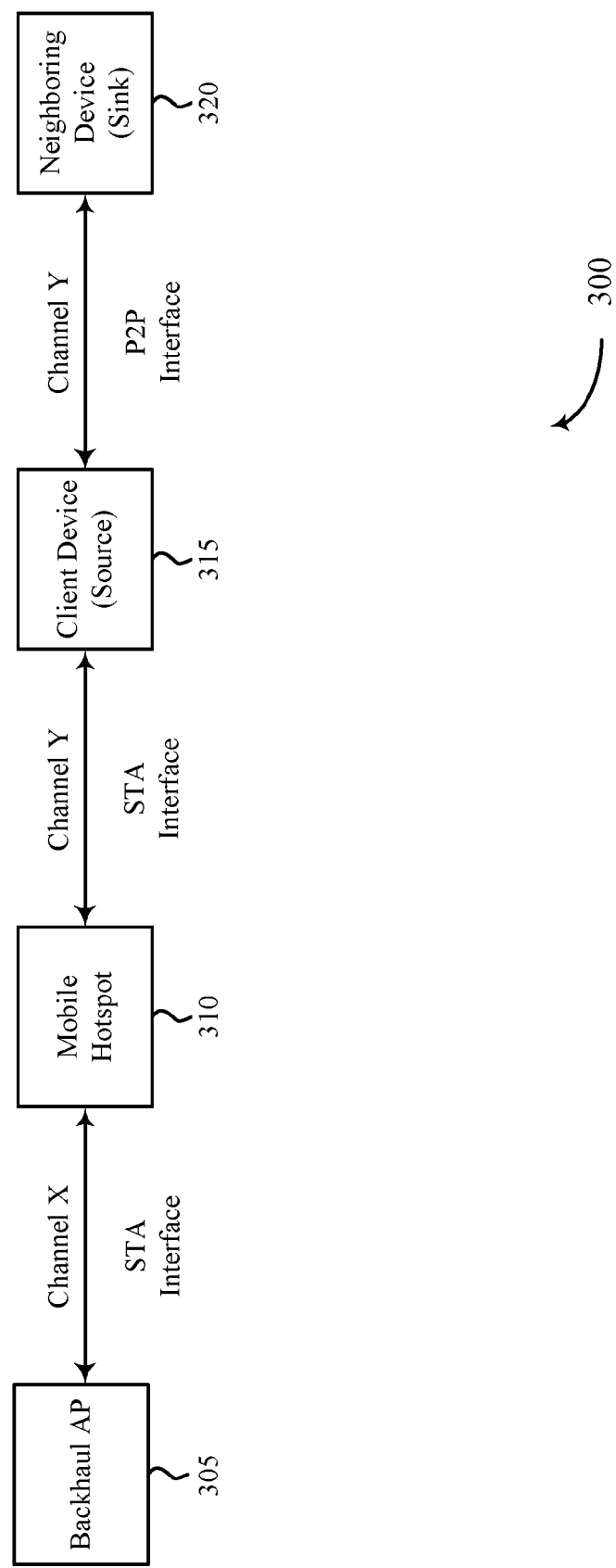
FIG. 3 shows a block diagram of aspects of a wireless communication system that supports channel efficient tune away procedures, in accordance with various aspects of the present disclosure.

FIG. 3 illustrates a diagram 300 of wireless communications that supports channel efficient tune away procedures. Generally, diagram 300 shows an example of wireless communications between a backhaul AP 305, a mobile hotspot 310, a client device 315, and a neighboring device 320. Backhaul AP 305 may be an example of an AP 105 described with reference to FIGS. 1 and/or 2. The mobile hotspot 310 may be an example of an AP 105 and/or a STA 115 operating as an AP as described with reference to FIGS. 1 and/or 2. The client device 315 and/or the neighboring device 320 may be examples of a STA 115 described with reference to FIGS. 1 and/or 2.

In FIG. 3, the backhaul AP 305 may be connected to, and communicate with the mobile hotspot 310 using channel X according to a wireless station interface. The mobile hotspot 310 may be connected to, and communicate with the client device 315 using channel Y according to a wireless station interface. The client device 315 may be connected to, and communicate with the neighboring device 320 using channel Y according to a P2P interface. Channel X may be a different channel than channel Y.

Broadly, diagram 300 illustrates an example where the described channel efficient tune away procedures are used when the mobile hotspot 310 connects to backhaul AP 305 using channel X while serving client device 315 on channel Y and, also, while client device 315 communicates with neighboring device 320 on channel Y. For example, client device 315 may be a source device that streams or broadcasts content to a sink device such as neighboring device 320 on channel Y. Client device 315 may be connected to mobile hotspot 310 to access internet services, for example. Mobile hotspot 310 may need to tune away from channel Y and tune to channel X to download data, for example, from the internet via backhaul AP 305.

Prior to tuning away, the mobile hotspot 310 may transmit a CTS-S frame to client device 315 on channel Y. The CTS-S frame may, in some examples, include an information element that provides an indication to client device 315 that mobile hotspot 310 is performing a tune away procedure from channel Y. In other examples, the CTS-S frame may not include the indication and the client device 315 may learn the mobile hotspot's 310 tune away behavior, as described with reference to FIGS. 1 and/or 2.

Client device 315 may, based on the indication and/or the learned behavior, determine that channel Y is still available for direct communications and therefore continue to stream or broadcast content to neighboring device 320. Thus, client device 315 may use channel Y to perform direct communications with neighboring device 320 on channel Y while the mobile hotspot 310 tunes to channel X. When the mobile hotspot 310 completes the tune away procedure, it may again transmit a frame to the client device 315 that releases the channel, e.g., the information element may be set to indicate that the mobile hotspot 310 has tuned to channel Y.

Figure 4:
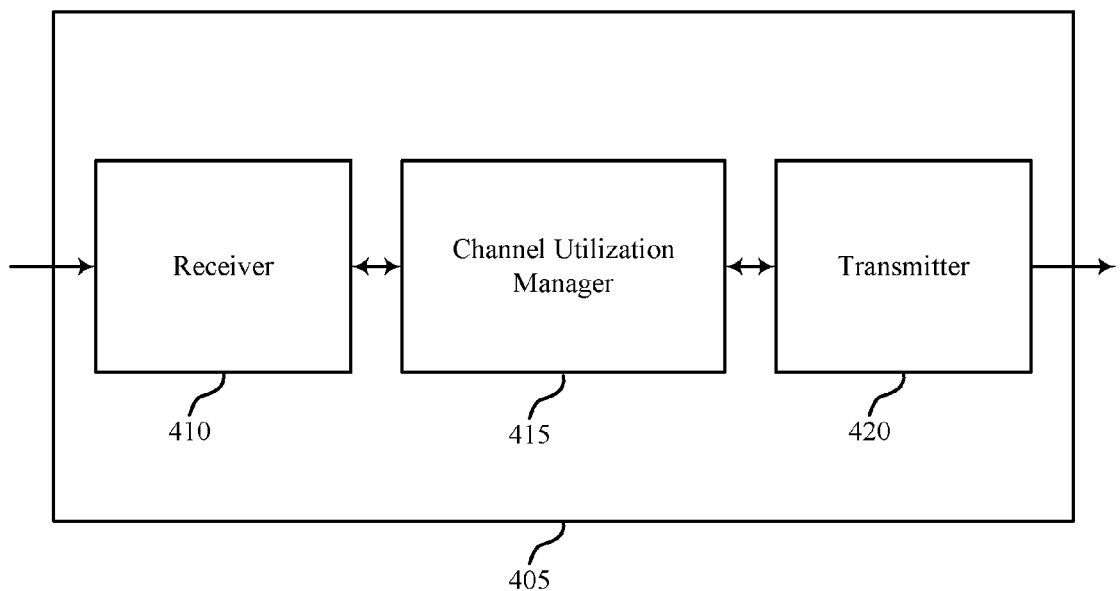
FIG. 4 shows a block diagram of a device for use in wireless communication, in accordance with various aspects of the present disclosure.

FIG. 4 shows a block diagram 400 of an apparatus 405 for use in a station for wireless communication, in accordance with various aspects of the present disclosure. In some examples, the apparatus 405 may be an example of aspects of the STAs 115 described with reference to FIGS. 1-3. The apparatus 405 may also be or include a processor (not shown). The apparatus 405 may include a receiver 410, a channel utilization manager 415, and/or a transmitter 420. Each of these components may be in communication with each other.

The apparatus 405, through the receiver 410, the channel utilization manager 415, and/or the transmitter 420, may perform functions described herein. For example, the apparatus 405 may support channel efficient tune away procedures where the apparatus 405 performs direct communications on the channel while the AP is tuned away.

The components of the apparatus 405 may, individually or collectively, be implemented using ASIC(s) adapted to perform some or all of the applicable functions in hardware. Alternatively, the functions may be performed by other processing units (or cores), on integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by general or application-specific processors.

The receiver 410 may receive information such as packets, user data, and/or control information associated with various information channels (e.g., control channels, data channels, broadcast channels, etc.). The receiver 410 may receive frames from an AP associated with the AP performing a tune away procedure. Information may be passed on to the channel utilization manager 415, and to other components of the apparatus 405.

The channel utilization manager 415 may monitor, control, provide a means for, or otherwise manage aspects of a channel efficient tune away procedure for the apparatus 405. The channel utilization manager 415 may receive a frame reserving a channel for a time period. The frame may be received from an AP and may include an information field associated with a tune away procedure performed by the AP during the time period. The channel utilization manager 415 may perform, based on the information field, direct communications with a neighboring device on the channel during the time period.

The channel utilization manager 415 may receive a plurality of CTS-S frames reserving the channel, each CTS-S frame reserving the channel for at least one time period. The channel utilization manager 415 may determine that the AP is not communicating during a predetermined number of time periods and perform a direct communications with the neighboring device based on the AP not communicating during the predetermined number of time periods.

The transmitter 420 may transmit the signals received from other components of the apparatus 405. The transmitter 420 may transmit various signals related to channel utilization while an AP is performing a tune away procedure. In some examples, the transmitter 420 may be collocated with the receiver 410 in a transceiver. The transmitter 420 may include a single antenna, or it may include a plurality of antennas.

Figure 5:
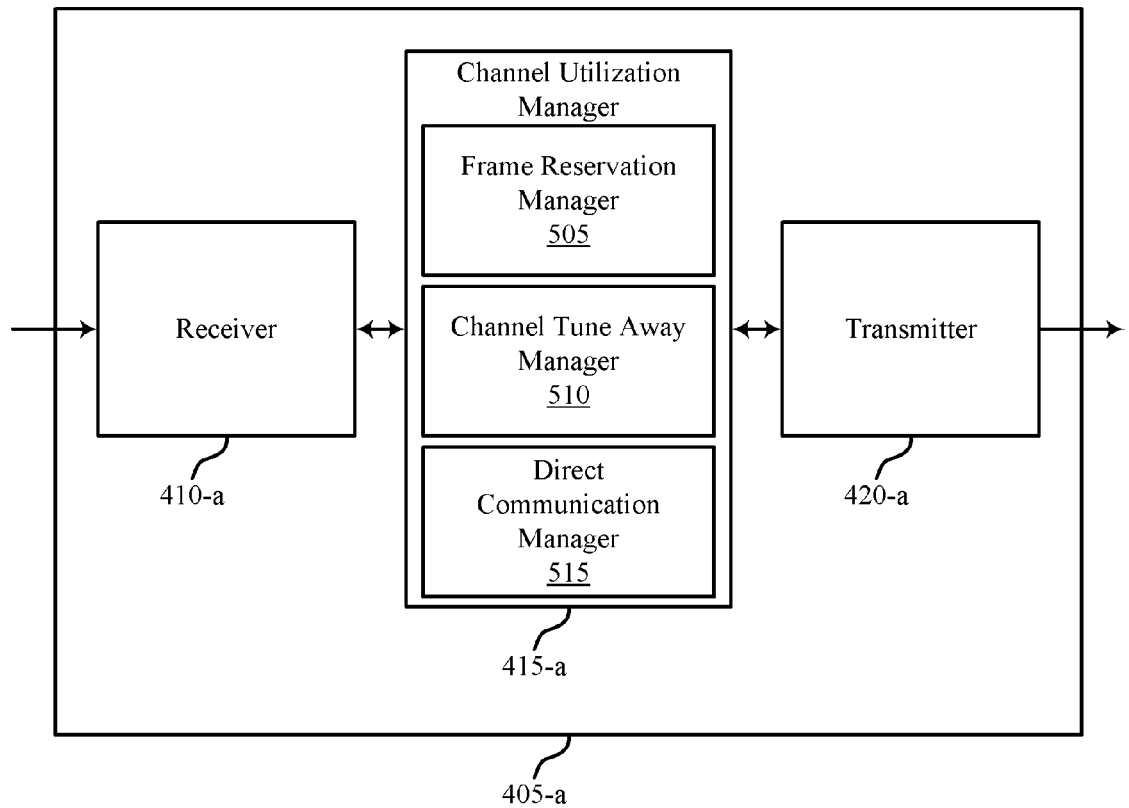
FIG. 5 shows a block diagram of a device for use in wireless communication, in accordance with various aspects of the present disclosure.

FIG. 5 shows a block diagram 500 of an apparatus 405-*a* that is used in a wireless station for wireless communication, in accordance with various examples. The apparatus 405-*a* may be an example of aspects of a STA 115 described with reference to FIGS. 1-3. It may also be an example of an apparatus 405 described with reference to FIG. 4. The apparatus 405-*a* may include a receiver 410-*a*, a channel utilization manager 415-*a*, and/or a transmitter 420-*a*, which may be examples of the corresponding components of apparatus 405. The apparatus 405-*a* may also include a processor (not shown). Each of these components may be in communication with each other. The channel utilization manager 415-*a* may include a frame reservation manager 505, a channel tune away manager 510, and/or a direct communication manager 515. The receiver 410-*a* and the transmitter 420-*a* may perform the functions of the receiver 410 and the transmitter 420, of FIG. 4, respectively.

The frame reservation manager 505 may monitor, control, provide a means for, or otherwise manage aspects of a frame reservation for the apparatus 405-*a*. For example, the frame reservation manager 505 may receive, from an AP, a frame reserving a channel for a time period. The frame may, in some examples, include an information field of bit that is associated with a tune away procedure performed by the AP during the time period. The frame reservation manager 505 may receive, from the AP, a plurality of CTS-S frames reserving the channel. Each CTS-S frame may reserve the channel for at least one time periods. The AP may be a mobile hotspot. The AP may be a Wi-Fi AP. The AP may be a serving AP or the AP may be a non-serving AP.

The channel tune away manager 510 may monitor, control, provide a means for, or otherwise manage an AP performing a tune away procedure for the apparatus 405-*a*. For example, the channel tune away manager 510 may determine the frame comprises the information field by decoding a power management field of a CTS-S frame. The channel tune away manager 510 may determine the frame comprises the information field by decoding a power management field of a broadcast action frame. The broadcast action frame may be decoded after decoding a CTS-S frame.

The channel tune away manager 510 may determine that the AP is not communicating during a predetermined number of the time periods. The determination may be based on the channel tune away manager 510 determining that the AP has not transmitted on the channel. The channel tune away manager 510 may determine that the AP has communicated on the channel during at least one of the time periods.

The direct communication manager 515 may monitor, control, provide a means for, or otherwise manage aspects of direct communications for the apparatus 405-*a*. For example, the direct communication manager 515 may perform direct communications with a neighboring device on the channel during the time period. Performing the direct communications may be based on the information field included in the frame reserving the channel. Performing the direct communications may be based on the AP not communicating during the predetermined number of time periods. The direct communication manager 515 may perform a channel access procedure on the channel prior to performing the direct communications with the neighboring device. The channel may be a Wi-Fi display channel and the direct communications may include streaming content to the neighboring device on the channel during the time period.

When the AP has communicated on the channel during at least one of the time periods, the direct communication manager 515 may refrain from performing the direct communications with the neighboring device based on the AP having communicated.

Figure 6:
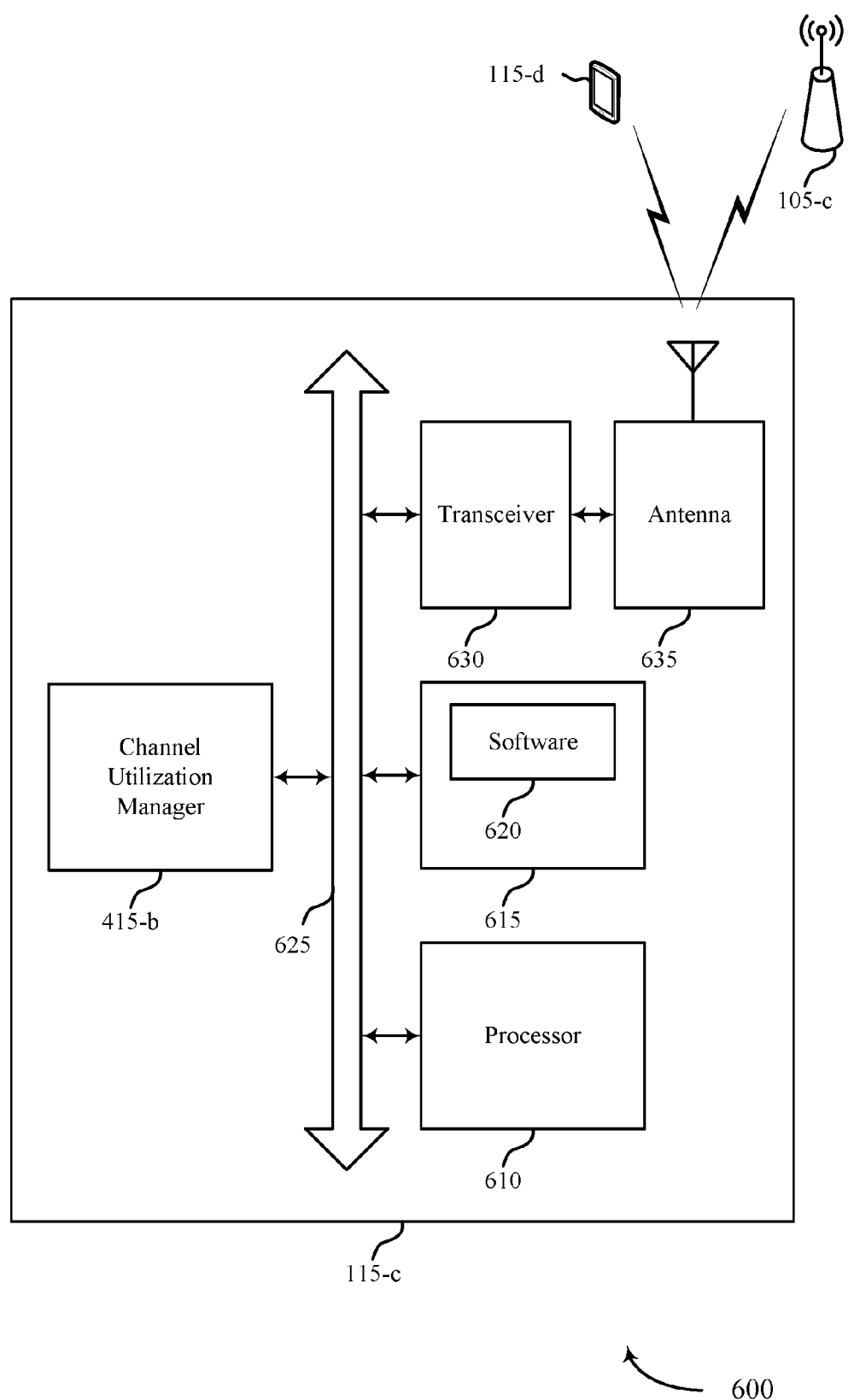
FIG. 6 shows a block diagram of a wireless communication system, in accordance with various aspects of the present disclosure.

Turning to FIG. 6, a diagram 600 is shown that illustrates a STA 115-*c* for channel efficient tune away procedures. The STA 115-*c* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The STA 115-*c* may have an internal power supply (not shown), such as a small battery, to facilitate mobile operation. The STA 115-*c* may be an example of the STAs 115 of FIGS. 1-3 and/or may be an example of the apparatus 405 of FIGS. 4-5.

The STA 115-*c* may include a processor 610, a memory 615, a transceiver 630, antennas 635, and a channel utilization manager 415-*b*. The channel utilization manager 415-*b* may be an example of the channel utilization manager 415 of FIGS. 4-5. Each of these components may be in communication with each other, directly or indirectly, over at least one bus 625.

The memory 615 may include RAM and ROM. The memory 615 may store computer-readable, computer-executable software (SW) code 620 containing instructions that, when executed, cause the processor 610 to perform various functions described herein for channel efficient tune away procedures. Alternatively, the software code 620 may not be directly executable by the processor 610 but may cause a computer (e.g., when compiled and executed) to perform functions described herein.

The processor 610 may include an intelligent hardware device, e.g., a CPU, a microcontroller, an ASIC, etc. The processor 610 may process information received through the transceiver 630 and/or to be sent to the transceiver 630 for transmission through the antennas 635. The processor 610 may handle, alone or in connection with the channel utilization manager 415-b, various aspects for efficient channel tune away procedures, e.g., receiving and/or determining when a frame reserving a channel is associated with the AP performing a tune away procedure and utilizing the channel while the AP is tuned away.

The transceiver 630 may communicate bi-directionally with AP 105-c and/or STA 115-d, such as APs 105 and/or STAs 115 described with reference to FIGS. 1-3. The transceiver 630 may be implemented as at least one transmitter and at least one separate receiver. The transceiver 630 may include a modem to modulate the packets and provide the modulated packets to the antennas 635 for transmission, and to demodulate packets received from the antennas 635. While the STA 115-c may include a single antenna 635, there may be aspects in which the STA 115-c may include multiple antennas 635.

The components of the STA 115-c may implement aspects discussed above with respect to FIGS. 1-3, and those aspects may not be repeated here for the sake of brevity. Moreover, the components of the STA 115-c may implement aspects discussed below with respect to FIGS. 7-9, and those aspects may not be repeated here also for the sake of brevity.

Figure 7:
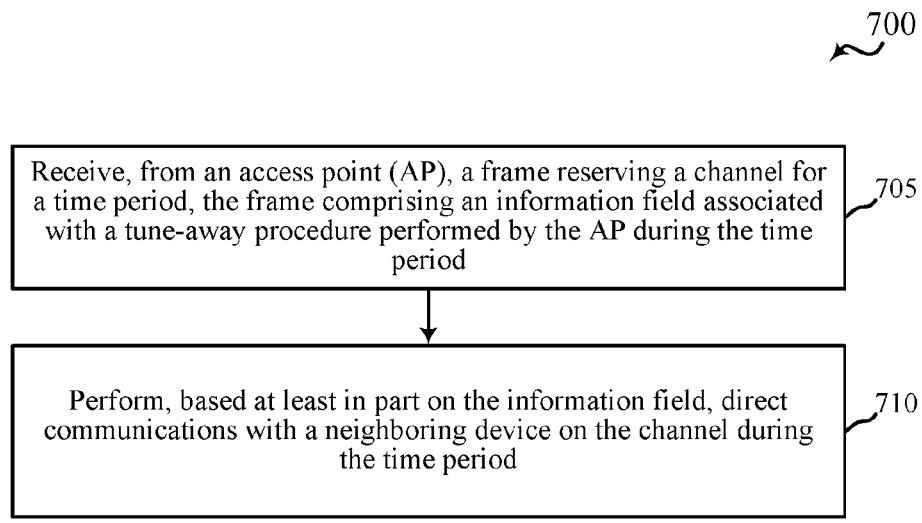
FIGS. 7 through 9 show flow charts illustrating examples of a method for wireless communication, in accordance with various aspects of the present disclosure.

FIG. 7 shows a flowchart illustrating a method 700 for channel efficient tune away procedures in accordance with various aspects of the present disclosure. The operations of method 700 may be implemented by a STA 115 or its components as described with reference to FIGS. 1 through 3 and 6 and/or by an apparatus 405 or its components as described with reference to FIGS. 4 and/or 5. For example, the operations of method 700 may be performed by the channel utilization manager as described herein. In some examples, the STA 115 may execute a set of codes to control the functional elements of the STA 115 to perform the functions described below. Additionally or alternatively, the STA 115 may perform aspects the functions described below using special-purpose hardware.

At block 705, the method 700 may include the STA 115 receiving, from an AP, a frame reserving a channel for a time period, the frame comprising an information field associated with a tune away procedure performed by the AP during the time period, as described above with reference to FIGS. 2 through 3. In certain examples, the operations of block 705 may be performed by the frame reservation manager 505 as described with reference to FIG. 5.

At block 710, the method 700 may include the STA 115 performing, based on the information field, direct communications with a neighboring device on the channel during the time period, as described above with reference to FIGS. 2 through 3. In certain examples, the operations of block 710 may be performed by the direct communication manager 515 as described with reference to FIG. 5.

Figure 8:
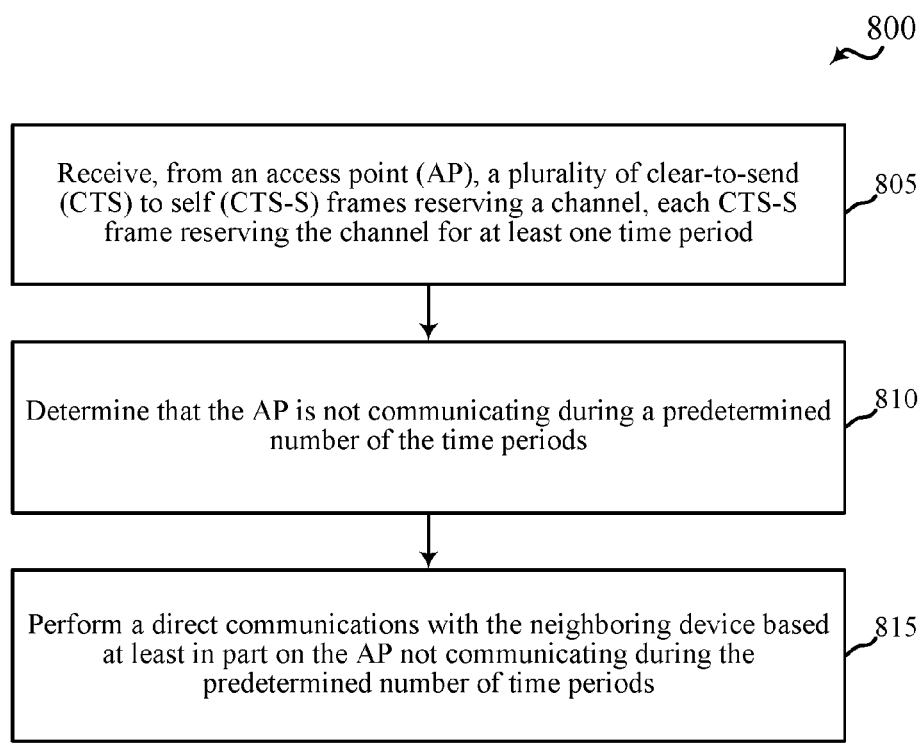

FIG. 8 shows a flowchart illustrating a method 800 for channel efficient tune away procedures in accordance with various aspects of the present disclosure. The operations of method 800 may be implemented by a STA 115 or its components as described with reference to FIGS. 1 through 3 and 6 and/or by an apparatus 405 or its components as described with reference to FIGS. 4 and/or 5. For example, the operations of method 800 may be performed by the channel utilization manager as described herein. In some examples, the STA 115 may execute a set of codes to control the functional elements of the STA 115 to perform the functions described below. Additionally or alternatively, the STA 115 may perform aspects the functions described below using special-purpose hardware.

At block 805, the method 800 may include the STA 115 receiving, from an AP, a plurality of CTS-S frames reserving a channel, each CTS-S frame reserving the channel for at least one time period, as described above with reference to FIGS. 2 through 3. In certain examples, the operations of block 805 may be performed by the frame reservation manager 505 as described with reference to FIG. 5.

At block 810, the method 800 may include the STA 115 determining that the AP is not communicating during a predetermined number of the time periods, as described above with reference to FIGS. 2 through 3. In certain examples, the operations of block 810 may be performed by the channel tune away manager 510 as described with reference to FIG. 5.

At block 815, the method 800 may include the STA 115 performing a direct communications with a neighboring device based on the AP not communicating during the predetermined number of time periods, as described above with reference to FIGS. 2 through 3. In certain examples, the operations of block 815 may be performed by the direct communication manager 515 as described with reference to FIG. 5.

Figure 9:
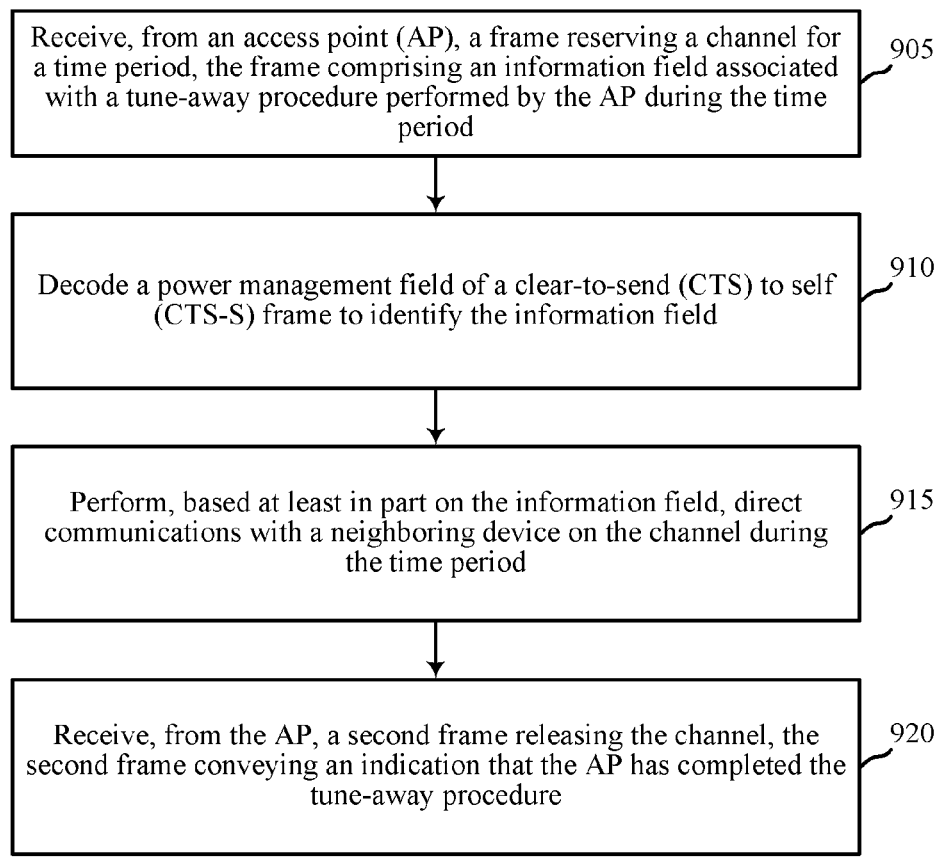

FIG. 9 shows a flowchart illustrating a method 900 for channel efficient tune away procedures in accordance with various aspects of the present disclosure. The operations of method 900 may be implemented by a STA 115 or its components as described with reference to FIGS. 1 through 3 and 6 and/or by an apparatus 405 or its components as described with reference to FIGS. 4 and/or 5. For example, the operations of method 900 may be performed by the channel utilization manager as described herein. In some examples, the STA 115 may execute a set of codes to control the functional elements of the STA 115 to perform the functions described below. Additionally or alternatively, the STA 115 may perform aspects the functions described below using special-purpose hardware.

At block 905, the method 900 may include the STA 115 receiving, from an AP, a frame reserving a channel for a time period, the frame comprising an information field associated with a tune away procedure performed by the AP during the time period, as described above with reference to FIGS. 2 through 3. In certain examples, the operations of block 705 may be performed by the frame reservation manager 505 as described with reference to FIG. 5.

At block 910, the method 900 may include the STA 115 decoding a power management field of a CTS-S frame to identify the information field, as described above with reference to FIGS. 2 through 3. In certain examples, the operations of block 910 may be performed by the frame reservation manager 505 as described with reference to FIG. 5.

At block 915, the method 900 may include the STA 115 performing, based on the information field, direct communications with a neighboring device on the channel during the time period, as described above with reference to FIGS. 2 through 3. In certain examples, the operations of block 915 may be performed by the direct communication manager 515 as described with reference to FIG. 5.

At block 920, the method 900 may include the STA 115 receiving, from the AP, a second frame releasing the channel, the second frame conveying an indication that the AP has completed the tune away procedure, as described above with reference to FIGS. 2 through 3. In certain examples, the operations of block 920 may be performed by the direct communication manager 515 as described with reference to FIG. 5.

In some examples, aspects from two or more of the methods 700-900 may be combined. It should be noted that the methods 700, 800, etc., are just example implementations, and that the operations of the methods 700-900 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method for wireless communication at a mobile device, comprising:
   receiving, from an access point (AP), a clear-to-send (CTS) to self (CTS-S) frame reserving a channel for a time period, the CTS-S frame comprising a power management field associated with a tune-away procedure performed by the AP during the time period, wherein the AP is not communicating on the channel during the time period; and performing, based at least in part on the power management field, direct communications between the mobile device and a neighboring device on the channel during the time period.

2. The method of claim 1, further comprising:
receiving, from the AP, a second frame releasing the channel, the second frame conveying an indication that the AP has completed the tune-away procedure.

3. The method of claim 1, further comprising:
performing a channel access procedure on the channel prior to performing the direct communications with the neighboring device.

4. The method of claim 1, wherein the AP is a mobile hotspot.

5. The method of claim 1, wherein the AP is a Wi-Fi AP.

6. The method of claim 1, wherein performing direct communications with the neighboring device comprises:
streaming content to the neighboring device on the channel during the time period.

7. The method of claim 6, wherein the channel is a Wi-Fi display channel.

8. A mobile device for wireless communications, comprising:
a frame reservation manager to receive, from an access point (AP), a clear-to-send (CTS) to self (CTS-S) frame reserving a channel for a time period, the frame comprising power management field associated with a tune-away procedure performed by the AP during the time period, wherein the AP is not communicating on the channel during the time period; and
a direct communication manager to perform, based at least in part on the power management field, direct communications between the mobile device and a neighboring device on the channel during the time period.

9. The mobile device of claim 8, wherein the direct communication manager receives, from the AP, a second frame releasing the channel, the second frame conveying an indication that the AP has completed the tune-away procedure.

10. The mobile device of claim 8, wherein the direct communication manager performs a channel access procedure on the channel prior to performing the direct communications with the neighboring device.

11. The mobile device of claim 8, wherein the AP is a mobile hotspot.

12. The mobile device of claim 8, wherein the AP is a Wi-Fi AP.

13. The mobile device of claim 8, wherein the direct communication manager to perform direct communications with the neighboring device is to stream content to the neighboring device on the channel during the time period.

14. The mobile device of claim 13, wherein the channel is a Wi-Fi display channel.

15. A method for wireless communication at a mobile device, comprising:
receiving, from an access point (AP), a plurality of clear-to-send (CTS) to self (CTS-S) frames reserving a channel, each CTS-S frame reserving the channel for at least one time period;
determining that the AP is performing a tune-away procedure during a predetermined number of the time periods; and
performing a direct communications between the mobile device and a neighboring device based at least in part on the AP performing the tune-away procedure during the predetermined number of time periods.

16. The method of claim 15, wherein determining that the AP is performing the tune-away procedure during the predetermined number of time periods comprises:
determining that the AP has not transmitted on the channel.

17. The method of claim 15, further comprising:
determining that the AP has communicated on the channel during at least one of the time periods; and
refraining from performing the direct communications with the neighboring device based at least in part on the determining that the AP has communicated.

18. The method of claim 15, wherein the AP is a serving AP.

19. The method of claim 15, wherein the AP is a non-serving AP.

20. A mobile device for wireless communication, comprising:
a frame reservation manager to receive, from an access point (AP), a plurality of clear-to-send (CTS) to self (CTS-S) frames reserving a channel, each CTS-S frame reserving the channel for at least one time period;
a channel tune away manager to determine that the AP is performing a tune-away procedure during a predetermined number of the time periods; and
a direct communication manager to perform a direct communications between the mobile device and a neighboring device based at least in part on the AP performing the tune-away procedure during the predetermined number of time periods.

21. The mobile device of claim 20, wherein the channel tune away manager to determine that the AP is performing the tune-away procedure during the predetermined number of time periods is to determine that the AP has not transmitted on the channel.

22. The mobile device of claim 20, wherein the channel tune away manager is to determine that the AP has communicated on the channel during at least one of the time periods; and
wherein the direct communication manager is to refrain from performing the direct communications with the neighboring device based at least in part on the determining that the AP has communicated.

23. The mobile device of claim 20, wherein the AP is a serving AP.

24. The mobile device of claim 20, wherein the AP is a non-serving AP.

25. A method for wireless communication at a mobile device, comprising:
receiving, from an access point (AP) and after receiving a clear-to-send (CTS) to self (CTS-S) frame, a broadcast action frame reserving a channel for a time period, the broadcast action frame comprising a power management field associated with a tune-away procedure performed by the AP during the time period, wherein the AP is not communicating on the channel during the time period; and
performing, based at least in part on the power management field, direct communications between the mobile device and a neighboring device on the channel during the time period.

26. The method of claim 24, further comprising:
receiving, from the AP, a second frame releasing the channel, the second frame conveying an indication that the AP has completed the tune-away procedure.

27. The method of claim 24, further comprising:
performing a channel access procedure on the channel prior to performing the direct communications with the neighboring device.

28. The method of claim 24, wherein the AP is a mobile hotspot.

29. The method of claim 24, wherein the AP is a Wi-Fi AP.

30. The method of claim 24, wherein performing direct communications with the neighboring device comprises:
streaming content to the neighboring device on the channel during the time period.

31. The method of claim 29, wherein the channel is a Wi-Fi display channel.

32. A mobile device for wireless communications, comprising:
a frame reservation manager to receive, from an access point (AP) and after receiving a clear-to-send (CTS) to self (CTS-S) frame, a broadcast action frame reserving a channel for a time period, the broadcast action frame comprising a power management field associated with a tune-away procedure performed by the AP during the time period, wherein the AP is not communicating on the channel during the time period; and
a direct communication manager to perform, based at least in part on the power management field, direct communications between the mobile device and a neighboring device on the channel during the time period.

33. The mobile device of claim 32, wherein the direct communication manager receives, from the AP, a second frame releasing the channel, the second frame conveying an indication that the AP has completed the tune-away procedure.

34. The mobile device of claim 32, wherein the direct communication manager performs a channel access procedure on the channel prior to performing the direct communications with the neighboring device.

35. The mobile device of claim 32, wherein the AP is a mobile hotspot.

36. The mobile device of claim 32, wherein the AP is a Wi-Fi AP.

37. The mobile device of claim 32, wherein the direct communication manager to perform direct communications with the neighboring device is to stream content to the neighboring device on the channel during the time period.

38. The mobile device of claim 37, wherein the channel is a Wi-Fi display channel.

\* \* \* \* \*